(12) United States Patent
Trembley

(10) Patent No.: US 6,937,947 B2
(45) Date of Patent: Aug. 30, 2005

(54) BATTERY CHARGER SYSTEM AND METHOD FOR PROVIDING DETAILED BATTERY STATUS AND CHARGING METHOD INFORMATION

(75) Inventor: Matthew Glen Trembley, Grayson, GA (US)

(73) Assignee: LSI Logic Corporation, Milpitas, CA (US)

( * ) Notice: Subject to any disclaimer, the term of this patent is extended or adjusted under 35 U.S.C. 154(b) by 300 days.

(21) Appl. No.: 10/224,020

(22) Filed: Aug. 20, 2002

(65) Prior Publication Data

US 2004/0039534 A1 Feb. 26, 2004

(51) Int. Cl.[7] ............................ G01R 31/36; H02J 7/00
(52) U.S. Cl. ........................ 702/63; 320/107; 320/137
(58) Field of Search .............................. 702/57, 60, 63, 702/64, 65, 79, 130, 176, 177, 178, 182; 320/107, 128, 137, 148, 150, 155; 324/427

(56) References Cited

U.S. PATENT DOCUMENTS

| | | | | |
|---|---|---|---|---|
| 4,598,373 A | * | 7/1986 | Morishita et al. | 701/1 |
| 4,689,740 A | | 8/1987 | Moelands et al. | 364/200 |
| 4,849,682 A | * | 7/1989 | Bauer et al. | 320/106 |
| 5,122,722 A | * | 6/1992 | Goedken et al. | 320/116 |
| 5,136,620 A | * | 8/1992 | Eaves | 377/15 |
| 5,177,427 A | * | 1/1993 | Bugaj | 320/148 |
| 5,196,780 A | * | 3/1993 | Pacholok | 320/148 |
| 5,440,221 A | * | 8/1995 | Landau et al. | 320/155 |
| 5,541,490 A | * | 7/1996 | Sengupta et al. | 320/160 |
| 5,563,496 A | | 10/1996 | McClure | 320/48 |
| 5,592,069 A | * | 1/1997 | Dias et al. | 320/106 |
| 5,602,455 A | * | 2/1997 | Stephens et al. | 320/106 |
| 5,825,159 A | * | 10/1998 | Patino | 320/125 |
| 6,111,389 A | * | 8/2000 | Aranovich et al. | 320/150 |

OTHER PUBLICATIONS

Sanyo, Twicell, Sealed Type Nickel–Metal Hydride Batteries, Engineering Handbook, "Charging Methods and Charging Circuits", 6 pages.

Trembley, Battery Charger System and Method for Providing Detailed Battery Status and Charging Method Information About Multiple Batteries, Aug. 20, 2002.

* cited by examiner

Primary Examiner—Marc S. Hoff
Assistant Examiner—Manuel L. Barbee
(74) Attorney, Agent, or Firm—Yee & Associates, P.C.

(57) ABSTRACT

A battery charger system and method are disclosed for providing detailed battery status and charging method information and for controlling the charging of the battery. A controller is provided within the battery charger. The controller starts a measurement cycle. During the measurement cycle, current battery characteristics are determined by the battery charger. The controller determines a current charging method of the battery. Then controller then utilizes the battery characteristics and current charging method to determine an appropriate charging method for the battery. The controller then causes the battery charger to charge the battery utilizing the appropriate charging method.

40 Claims, 5 Drawing Sheets

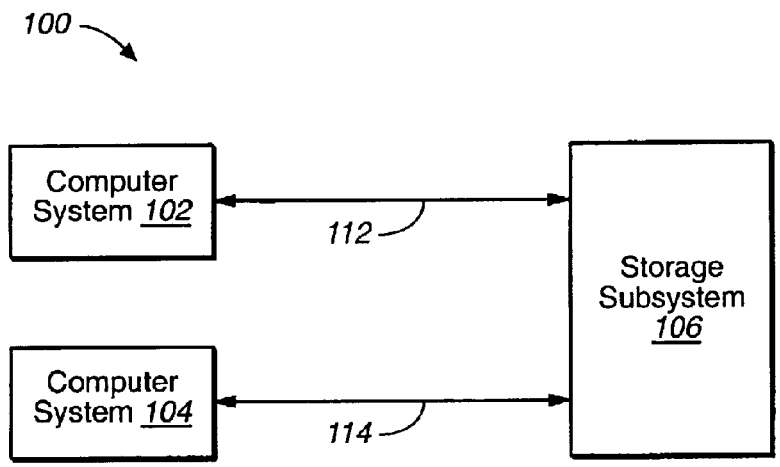
FIG._1
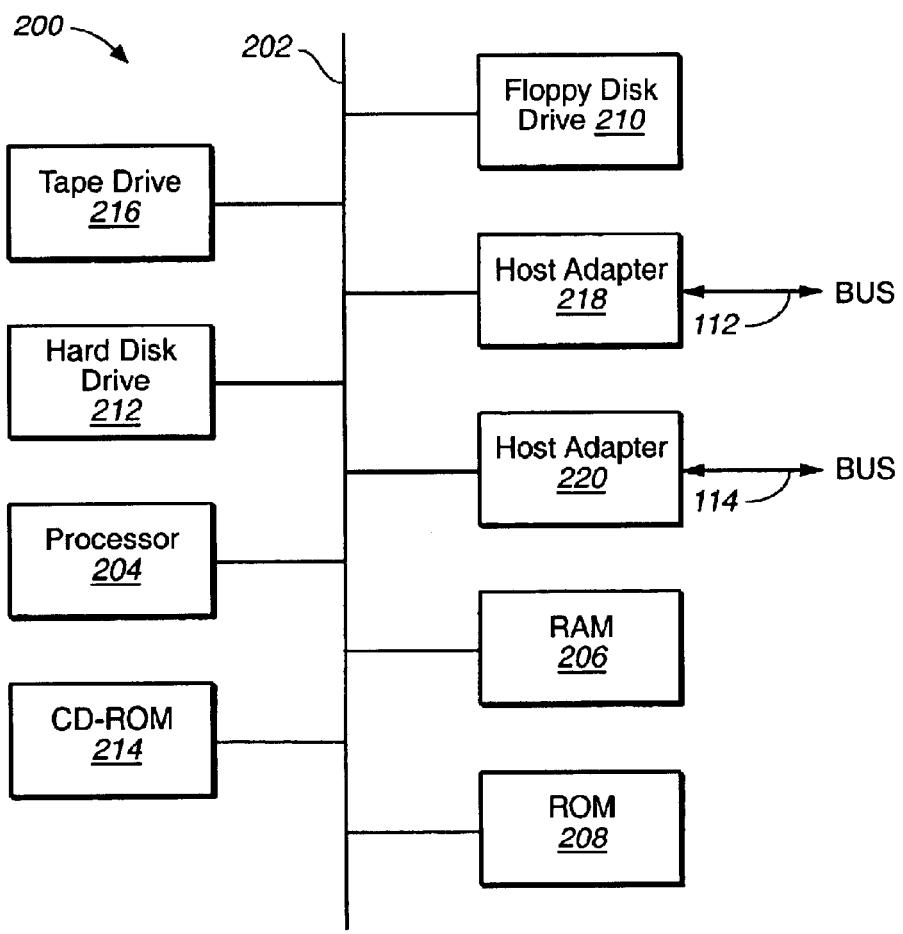
FIG._2

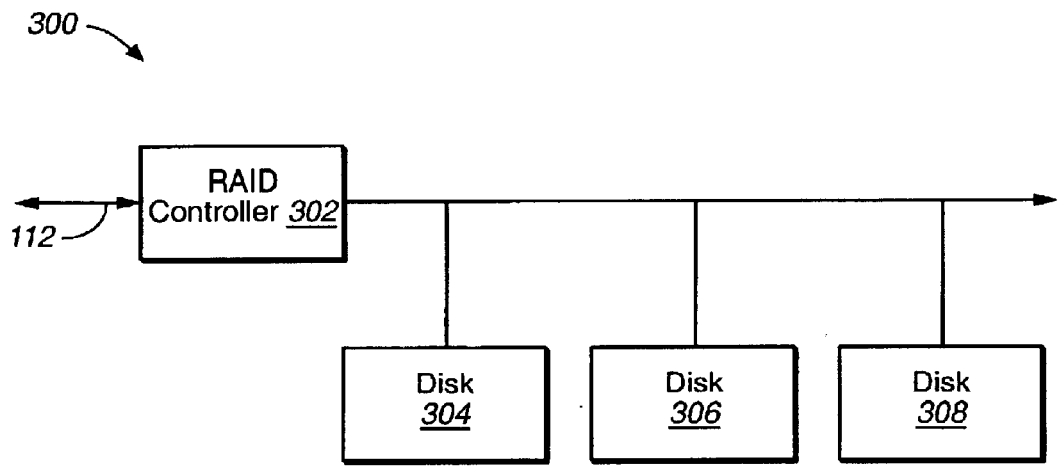
FIG._3
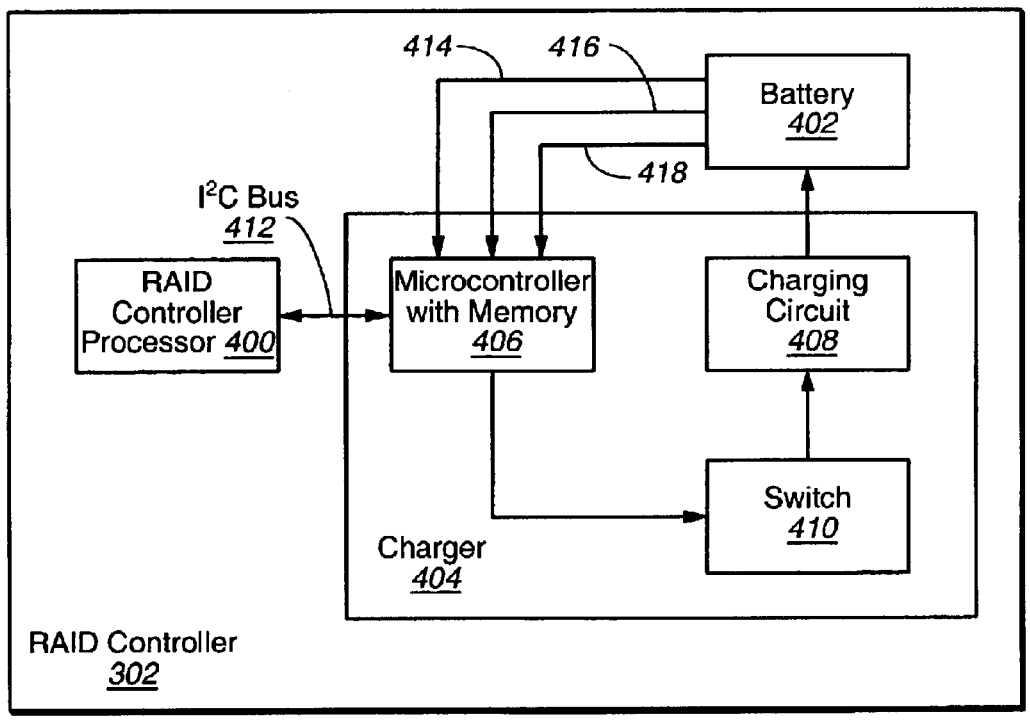
FIG._4

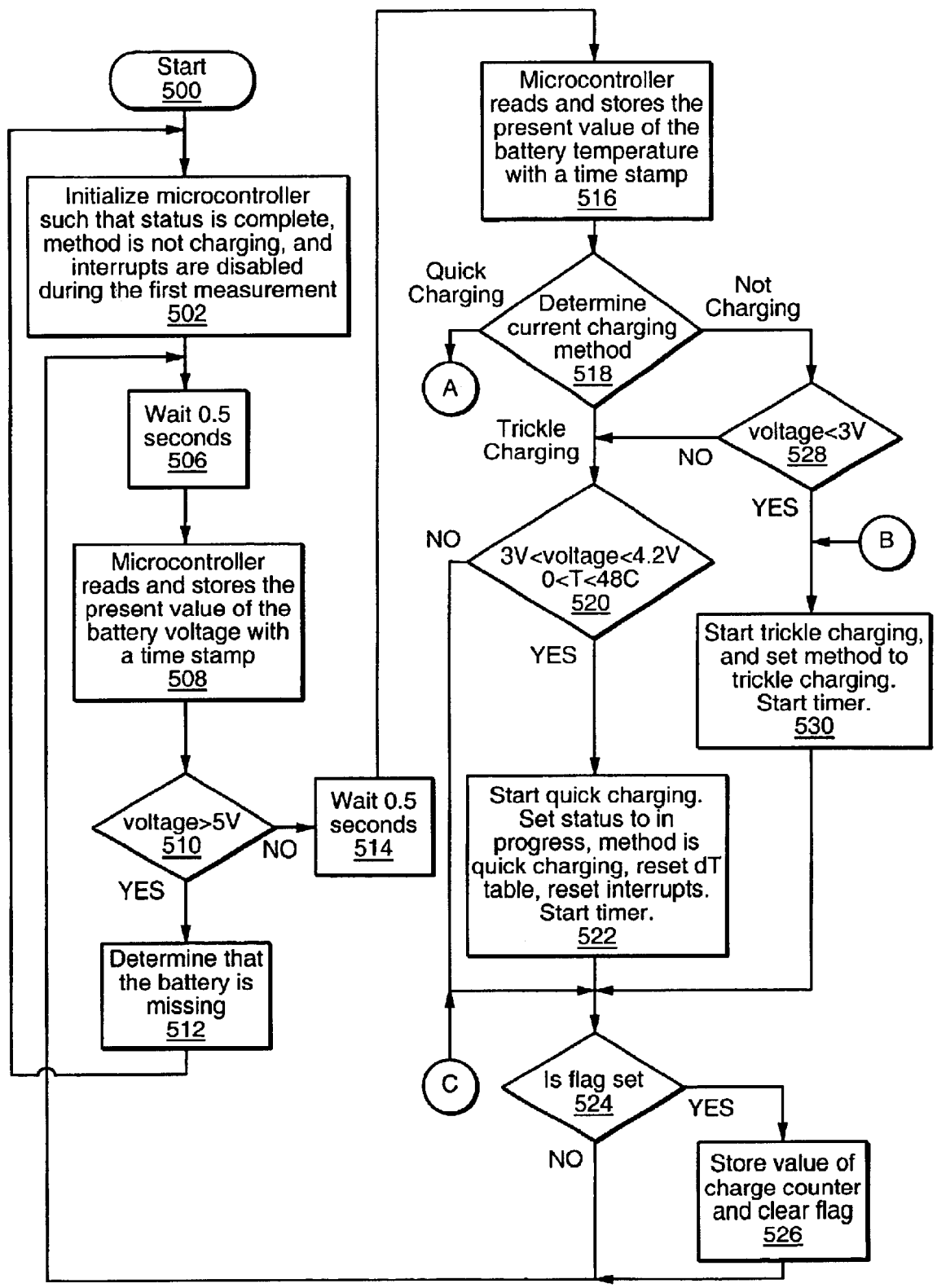
FIG._5A

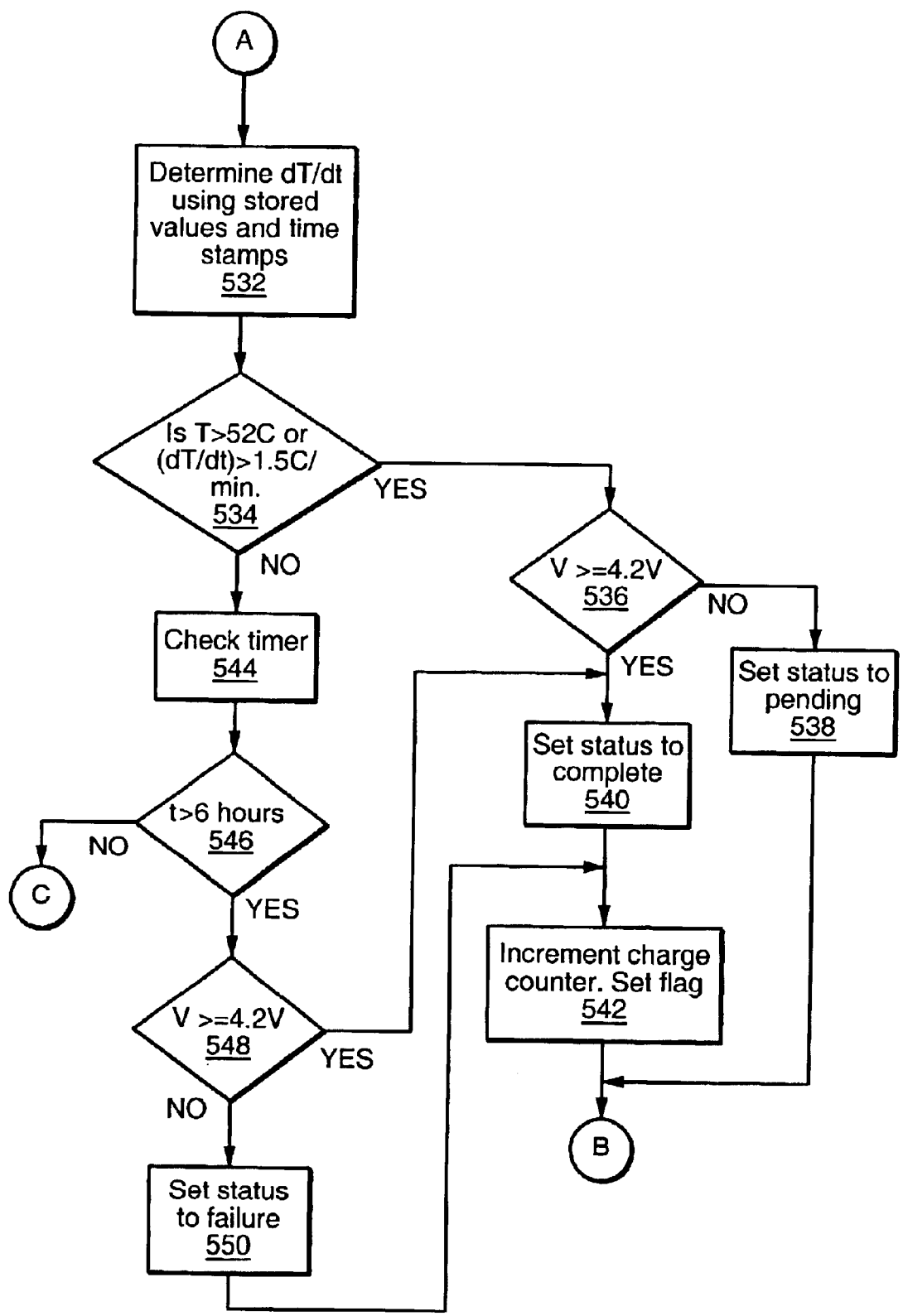
FIG._5B

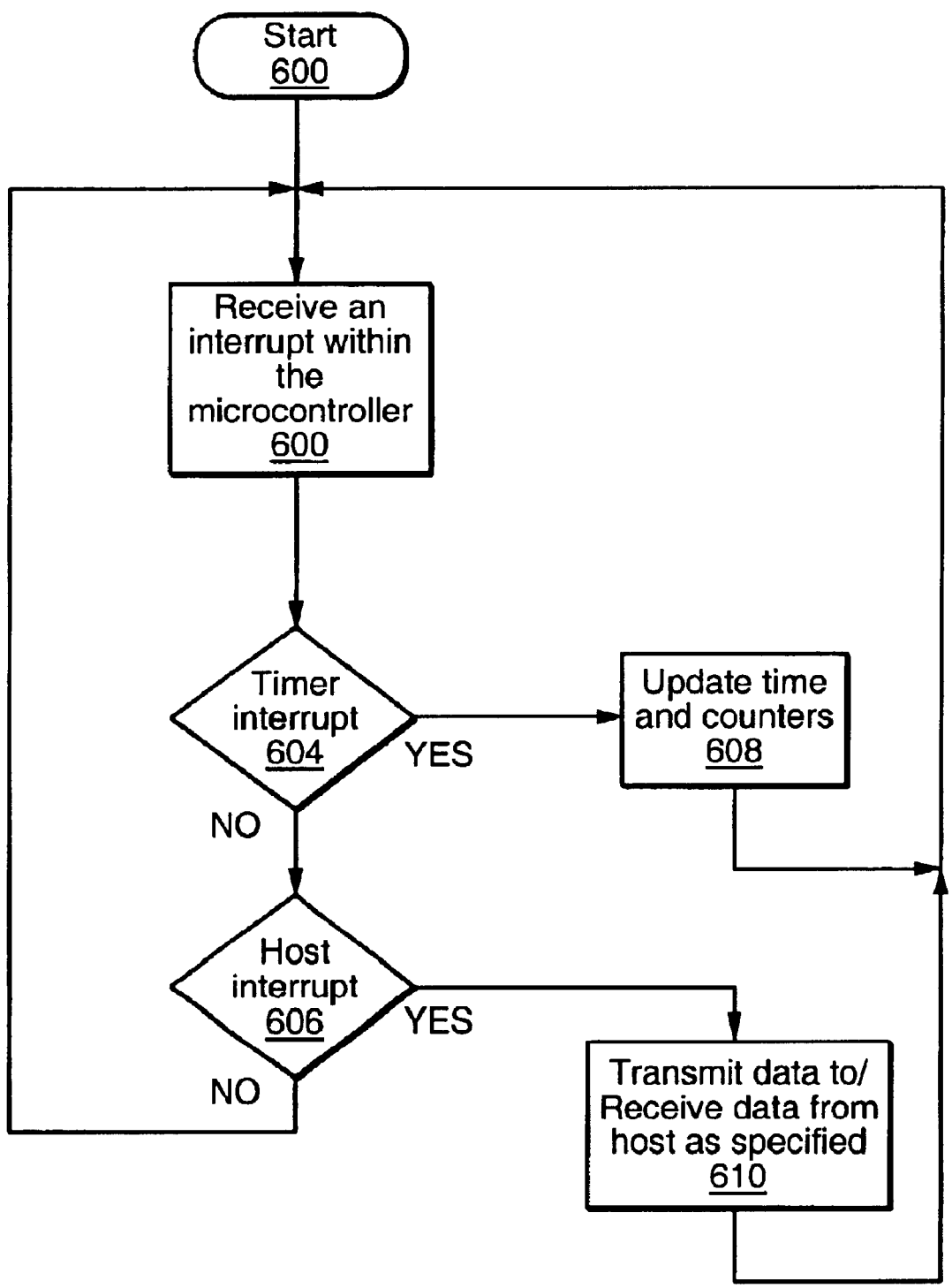
FIG._6

BATTERY CHARGER SYSTEM AND METHOD FOR PROVIDING DETAILED BATTERY STATUS AND CHARGING METHOD INFORMATION

CROSS REFERENCE TO RELATED APPLICATIONS

The subject matter of the present invention is related to copending U.S. Application Ser. No. 10/224,084, titled "Battery Charger System and Method for Providing Detailed Battery Status and Charging Method Information About Multiple Batteries", filed on the same date herewith, assigned to the same assignee, and incorporated herein by reference.

REFERENCE TO A COMPUTER PROGRAM LISTING APPENDIX

A computer program listing appendix is filed herewith submitted on a single compact disk and a duplicate copy of the compact disk. The contents of the compact disk, and its duplicate copy, include a single Adobe Acrobat file entitled, "02-4360 Battery Charger System and Method for Providing Detailed Battery Status and Charging Method Information", created on Aug. 19, 2002, which is 425 KB in size. The contents of this appendix, filed on compact disk, are incorporated herein by reference.

BACKGROUND OF THE INVENTION

1. Technical Field

The present invention relates generally to data processing systems including rechargeable batteries, and more particularly to a battery charger system and method for providing detailed battery status and charging method information and for controlling the charging of the battery.

2. Description of the Related Art

Rechargeable batteries are found in many different types of devices. Cellular telephones, laptop computer systems, and many other types of devices include such batteries. Storage controllers that are a part of a storage system also typically include a rechargeable battery. Host computer systems often connect to one or more storage controllers that provide access to an array of storage devices. In a common storage controller, microprocessors communicate the data between the storage array and the host computer system.

These batteries need to be routinely charged. Battery chargers are often provided as either internal or external devices to be used to recharge these batteries. For example, a storage controller may include a battery and a charger as part of the controller card. The prior art chargers typically provide little or no information regarding the battery or the battery's charging status. Because the process of charging a battery is more complicated than merely providing a constant voltage or current to the battery, additional information regarding the battery's characteristics, the current charging method, and historical information about the battery would be useful.

Therefore, a need exists for a battery charger system and method for providing detailed battery status information and for controlling the charging of the battery.

SUMMARY OF THE INVENTION

A battery charger system and method are disclosed for providing detailed battery status and charging method information and for controlling the charging of the battery. A controller is provided within the battery charger. The controller starts a measurement cycle. During the measurement cycle, current battery characteristics are determined by the battery charger. The controller determines a current charging method of the battery. The controller then utilizes the battery characteristics and current charging method to determine an appropriate charging method for the battery. The controller then causes the battery charger to charge the battery utilizing the appropriate charging method.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a block diagram of a data processing system in accordance with the present invention;

FIG. 2 is a block diagram of a computer system, such as one of the computer systems of FIG. 1, in which the present invention may be implemented;

FIG. 3 is a block diagram of a storage subsystem coupled to a storage controller which includes a battery charger in accordance with the present invention;

FIG. 4 is a block diagram of a storage controller that includes a battery and a battery charger in accordance with the present invention;

FIGS. 5A and 5B together depict a high level flow chart which illustrates a measurement cycle of a battery by a microcontroller included within a battery charger and a state diagram that controls charging in accordance with the present invention; and FIG. 6 illustrates a high level flow chart which depicts the processing of interrupts by the microcontroller in accordance with the present invention.

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

The present invention is a battery charger system and method for providing detailed battery status and charging method information and for controlling the charging of the battery. A battery is coupled to a battery charger. The battery charger includes a microcontroller that monitors battery characteristics during battery operation and charging. The microcontroller includes a bus interface that may be used to couple the battery charger to a processor that is external to the battery charger. The microcontroller may provide battery characteristics and charging method characteristics to the external processor through the bus interface.

The microcontroller within the battery charger will start a measurement cycle of the battery. When the battery measurement is started, the battery voltage and temperature will be measured and stored within the battery charger. In addition, the controller within the battery charger will determine a current charging method of the battery. The charging method may be either a quick charging method, a trickle charging method, or no charging. The battery charger will start trickle charging the battery when the battery voltage is below a first threshold. A status register within the microcontroller in the charger will then be set to indicate that the battery is being charged using a "trickle charging" method. In addition, a timer within the microcontroller will be started. This timer tracks the amount of time that has elapsed since the charging had begun. The battery will be trickle charged until the battery voltage reaches the first threshold.

If the current voltage is between the first threshold and a second threshold and the battery is not too hot or too cold, the microcontroller in the battery charger will start charging the battery using a "quick charging" method. A status register in the microcontroller in the charger will indicate the "quick charge" method. A status register in the microcontroller will indicate charging being "in progress". A delta temperature table and the interrupts will be reset. The timer is then started by the microcontroller. The battery will be quick charged until it reaches the second threshold.

Detailed status information and charging method information are maintained by the battery charger while the battery is being monitored and/or charged. This status and charging method information includes the present value of the battery voltage, current and temperature as well as an indication of the current charging method of the battery. In addition to the charging method, the battery may be in one of many different states such as: pending, complete, or failure.

The battery is in a "pending" state when the battery became too hot or too hot too fast while being quick charged. The battery is in a "complete" state when quick charging has been successfully completed. The battery is in a "failure" state when the battery has exceeded a time threshold. The battery is in a "trickle charging" state when it is being trickle charged. The battery is in a "quick charging" state when it is being quick charged. The battery is in a "not charging" state when it is not being charged.

All of the state and method information is maintained, along with other battery characteristic information, within a microcontroller that is within the battery charger. The battery characteristic information may be accessed by a processor or system that is external to the battery charger through a bus interface provided by the microcontroller.

Although the present invention is described below as being part of a storage controller, the present invention may be utilized in any type of device which includes a battery and battery charger.

With reference now to the figures, and in particular with reference to FIG. 1, a data processing system 100 is depicted according to the present invention. Data processing system 100 includes computer systems 102 and 104, which are connected to storage subsystem 106. In the depicted example, storage subsystem 106 is a disk drive storage subsystem. Computer systems 102 and 104 are connected to storage subsystem 106 by bus 112 and bus 114. According to the present invention, bus 112 and bus 114 may be implemented using a number of different bus architectures, such as a small computer system interface (SCSI) bus or a fibre channel bus.

Turning now to FIG. 2, a block diagram of a computer system 200, such as computer system 102 or 104 in FIG. 1, is illustrated in which the present invention may be implemented. Computer system 200 includes a system bus 202 connected to a processor 204 and a memory 206. Computer system 200 also includes a read only memory (ROM) 208, which may store programs and data, such as, for example, a basic input/output system that provides transparent communications between different input/output (I/O) devices. In the depicted example, computer system 200 also includes storage devices, such as floppy disk drive 210, hard disk drive 212, CD-ROM 214, and tape drive 216. Computer system 200 sends and receives data to a storage subsystem, such as storage subsystem 106 in FIG. 1, through host adapters 218 and 220, which are connected to buses 112 and 114, respectively. These host adapters provide an interface to send and receive data to and from a storage subsystem in a data processing system.

A storage subsystem is a collection of storage devices managed separately from the primary processing system, such as a personal computer, a work station, or a network server. A storage subsystem includes a controller that manages the storage devices and provides an interface to the primary processing system to provide access to the storage devices within the storage subsystem. A storage system is typically physically separate from the primary processing system and may be located in a remote location, such as in a separate room. These host adapters provide an interface to send and receive data to and from a subsystem in a data processing system.

Programs supporting functions within host computer system 200 are executed by processor 204. While any appropriate processor may be used for processor 204, the Pentium microprocessor, which is sold by Intel Corporation and the Power PC 620, available from International Business Machines Corporation and Motorola, Inc. are examples of suitable processors. "Pentium" is a trademark of the Intel Corporation, and "Power PC" is a trademark of International Business Machines Corporation.

Additionally, databases and programs may be found within a storage device, such as hard disk drive 212. Data used by processor 204 and other instructions executed by processor 204 may be found in RAM 206 and ROM 208.

FIG. 3 is a block diagram of a storage subsystem coupled to a storage controller which includes a battery charger in accordance with the present invention. In the depicted example, storage subsystem 300 is a disk drive (i.e., a hard disk drive) system containing a controller 302. FIG. 3 depicts additional detail for only one of the controllers and its associated drives of FIG. 2. Controller 302 is connected to bus 112. This controller controls disk drives 304, 306, and 308.

FIG. 4 is a block diagram of a storage controller that includes a battery and a battery charger in accordance with the present invention. Storage controller 302 includes a controller processor 400, a battery 402, and a battery charger 404. Controller processor 400 is coupled to charger 404 utilizing a bus 412. Although bus 412 preferably conforms to the I²C protocol, any suitable bus architecture may be used.

Battery 402 is preferably a Nickel-Metal Hydride battery. However, those skilled in the art will recognize that the present invention may be utilized with any other type of battery that requires a similar method of charging by altering the voltage and temperatures thresholds described below.

Battery charger 404 includes a microcontroller 406, charging circuit 408, and switch 410. Microcontroller includes a memory, input/output (I/O) ports, counters, and timers. Microcontoller is coupled to switch 410, which is used by microcontroller 406 to permit or prohibit the charging of battery 402 by charging circuit 408. Microcontroller 406 may obtain the current operating characteristics of battery 402, such as temperature and voltage. Microcontroller may obtain the temperature of battery 402 using a temperature sensing line 414. Microcontroller may obtain the value of the voltage of battery 402 using a positive contact line 416 and a negative contact line 418. Microcontroller 406 utilizes the voltage and temperature to determine an appropriate charging method for battery 402, and to control the charging of battery 402 as described in more detail below.

Microcontroller 406 includes status registers in which may be stored all of the battery characteristics and charging method characteristics which include the state and charging method information, timer values, voltage values, counter values, table values, the state of flags, and temperature values. Battery characteristics, but are not limited to, include the battery voltage and temperature, and delta temperature/ delta time values. Charging method characteristics include, but are not limited to, the status of the charging method, such as complete, pending, failure, or in progress, in addition to the amount of time the battery has been charging, and the number of times the battery has been through a charging cycle. These status registers may be accessed by controller processor 400.

FIGS. 5A and 5B together depict a high level flow chart which illustrates a measurement cycle of a battery by a microcontroller included within a battery charger and a state diagram that controls charging in accordance with the present invention. The process illustrated by FIGS. 5A and 5B is executed by microcontroller 406. The process starts as depicted by block 500 and thereafter passes to block 502 which illustrates initializing the microcontroller. The status is set to "complete". The charging method is set to "not charging". And, interrupts are disabled during the first measurement cycle. Next, block 506 illustrates the microcontroller waiting 0.5 seconds. Thereafter, block 508 depicts the microcontroller reading and storing the present value of the battery voltage.

The process then passes to block 510 which illustrates a determination of whether or not the voltage of the battery is greater than 5V. If a determination is made that the battery voltage is greater than 5V, the process passes to block 512 which depicts a determination that the battery is missing. The process then passes back to block 502. Referring again to block 510, if a determination is made that the battery voltage is not greater than 5V, the process passes to block 514 which illustrates the microcontroller waiting 0.5 seconds. Thereafter, block 516 depicts the microcontroller reading and storing the present value of the battery temperature.

Block 518 illustrates a determination of the current charging method of the battery. If a determination is made that the current charging method is "trickle charging", the process passes to block 520 which depicts a determination of whether or not the battery voltage is between 3V and 4.2V and whether or not the temperature (T) is between 0 and 48° C. If the battery voltage is between 3V and 4.2V and the battery temperature is between 0 and 48° C., the battery has been charged using trickle charging to a point where quick charging is possible. If a determination is made that the voltage is between 3V and 4.2V and the temperature (T) is between 0 and 48° C., the process passes to block 522 which illustrates the microcontroller quick charging the battery. The charging method is set to "quick charging". The delta temperature (dT) table is reset, and the interrupts are reset. A timer within the microcontroller is started which will keep track of the elapsed time since charging was begun. A delta temperature table is maintained within the microcontroller utilizing the measured temperature values along with their associated time stamps.

The process then passes to block 524 which depicts a determination of whether or not a flag within the microcontroller has been set. The flag is set when quick charging has been completed. If a determination is made that the flag has not been set, the process passes back to block 506. Referring again to block 524, if a determination is made that the flag is set, the process passes to block 526 which illustrates the microcontroller storing the current value of the charge counter. The charge counter indicates the number of times this battery has been charged. The process then passes back to block 506. Referring again to block 520, if a determination is made that either the voltage is not between 3V and 4.2V or the temperature (T) is not between 0 and 48° C., the process passes to block 524.

Referring again to block 518, if a determination is made that the current method is "not charging", the process passes to block 528. During the first measurement, the charging method will be "not charging". Block 528 illustrates a determination of whether or not the battery voltage is less than 3V. If a determination is made that the battery voltage is not less than 3V, the process passes to block 520. Referring again to block 528, if a determination is made that the battery voltage is less than 3V, the process passes to block 530 which depicts starting trickle charging. The method is set to "trickle charging", and a timer within the microcontroller is started. The process then passes to block 524.

Referring again to block 518, if a determination is made that the current method is "quick charging", the process passes to block 532 as depicted through connector A. Block 532 illustrates a determination of the change in temperature divided by the change in time (dT/dt). Next, block 534 depicts a determination of whether or not the temperature of the battery is greater than 52° C. or whether dT/dt is greater than 1.5° C. per minute. If a determination is made that either the temperature of the battery is greater than 52° C. or dT/dt is greater than 1.5° C. per minute, the process passes to block 536 which illustrates a determination of whether or not the battery voltage is greater than or equal to 4.2V. If a determination is made that the battery voltage is not greater than or equal to 4.2V, the process passes to block 538 which depicts setting the status to "pending". The process then passes back to block 530 as illustrated through connector B.

Referring again to block 536, if a determination is made that the battery voltage is either greater than or equal to 4.2V, the process passes to block 540 which depicts setting the status to "complete" to indicate that the battery has finished quick charging. Next, block 542 illustrates incrementing the charge counter and setting the flag. The process then passes back to block 530 as illustrated through connector B.

Referring back to block 534, if a determination is made that the temperature of the battery is not greater than 52° C. and dT/dt is not greater than 1.5° C. per minute, the process passes to block 544 which illustrates the microcontroller checking the timer. Thereafter, block 546 depicts a determination of whether or not the current timer value is greater than six hours. If the timer indicates that greater than six hours have not passed, the process passes back to block 524 as depicted through Connector C. Referring again to block 546, if the timer indicates that greater than six hours have passed, the process passes to block 548 which illustrates a determination of whether or not the battery voltage is greater than or equal to 4.2V. If a determination is made that the battery voltage is greater than or equal to 4.2V, the process passes to block 540. Referring again to block 548, if a determination is made that the battery voltage is not greater than or equal to 4.2V, the process passes to block 550 which depicts setting the status to "failure". Next, the process passes to block 542.

FIG. 6 illustrates a high level flow chart which depicts the processing of interrupts by the microcontroller in accordance with the present invention. The process starts as illustrated by block 600 and thereafter passes to block 602 which depicts the receipt of an interrupt within the microcontroller. Next, block 604 illustrates a determination of whether or not the interrupt is a timer interrupt. If a determination is made that the interrupt is not a timer interrupt, the process passes to block 606 which depicts a determination of whether or not the interrupt is a host interrupt. If a determination is made that the interrupt is not a host interrupt the process passes back to block 602.

Referring again to block 604, if a determination is made that the interrupt is a timer interrupt, the process passes to block 608 which illustrates the microcontroller updating the time and counters. The process then passes back to block 602.

Referring again to block 606, if a determination is made that the interrupt is a host interrupt, the process passes to block 608 which illustrates the microcontroller transmitting data to or receiving data from the host as specified by the interrupt. The process then passes back to block 602.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a battery charger for charging a battery, said method comprising the steps of:

providing a controller within said battery charger, said controller capable of responding to interrupts and capable of being coupled to a processor that is external to said battery charger utilizing a bus interface that is included in said controller;

monitoring, using said controller, battery characteristics of said battery during normal non-charging battery operation and during charging of said battery;

maintaining, within status registers in said controller, during said normal operation of said battery, detailed status information including said battery characteristics;

maintaining, within said status registers, during charging of said battery, said detailed status information and an identification of a current charging method;

starting a measurement cycle;

during said measurement cycle:
determining current battery characteristics utilizing said battery charger;
determining, utilizing said controller, at a start of said measurement cycle, prior to beginning charging or altering said current charging method of said battery, said current charging method of said battery by reading said status registers, utilizing by said controller, said determined battery characteristics and said determined current charging method to determine an appropriate charging method for said battery; and causing, utilizing said controller, said battery charger to charge said battery utilizing said appropriate charging method.

2. The method according to claim 1, further comprising the steps of:

coupling said controller to said processor that is external to said battery charger; and providing battery information to said processor from said controller, said battery information including said battery characteristics and charging method information.

3. The method according to claim 1, wherein the step of determining current battery characteristics utilizing said battery charger further comprises the step of determining current battery characteristics utilizing said controller.

4. The method according to claim 1, wherein the step of determining said current charging method of said battery utilizing said controller further comprises the step of determining, utilizing said controller, whether said battery is currently being charged utilizing a quick charging method.

5. The method according to claim 4, further comprising the steps of:

in response to a determination that said battery is currently being charged utilizing a quick charging method, determining, utilizing said controller, whether a temperature of said battery exceeds a first temperature threshold;

in response to a determining that said temperature of said battery does not exceed said first threshold, determining whether a time during which said battery has been charged utilizing any method exceeds a time threshold;

in response to a determination that said time during which said battery has been charged utilizing any method does exceed a time threshold, determining whether said battery has been fully charged, and in response to a determination that said battery has been fully charged, incrementing a charge counter, said charge counter indicating a number of times said battery has completed a charge cycle.

6. The method according to claim 5, further comprising the steps of:

in response to a determination that said temperature of said battery does exceed said first threshold, determining whether said battery has been fully charged; and in response to a determination that said battery has been fully charged, incrementing said charge counter.

7. The method according to claim 6, further comprising the steps of
in response to a determination that said battery has not been fully charged, halting said quick charging method; and
charging said battery utilizing a trickle charging method.

8. The method according to claim 5, further comprising the steps of:
in response to a determination that said time during which said battery has been charged utilizing any method does not exceed a time threshold, starting said measurement cycle again.

9. The method according to claim 1, wherein the step of determining said current charging method of said battery utilizing said controller further comprises the step of determining, utilizing said controller, whether said battery is currently being charged utilizing a trickle charging method.

10. The method according to claim 9, further comprising the steps of:
determining whether a voltage of said battery is between a first voltage threshold and a second voltage threshold, end whether a temperature of said battery is between a first temperature threshold and a second temperature threshold; and
in response to a determination that said voltage is between said first voltage threshold and said second voltage threshold and that said temperature is between said first temperature threshold and said second temperature threshold, starting charging said battery utilizing a quick charging method.

11. The method according to claim 10, further comprising the step of:
starting a timer.

12. The method according to claim 10, further comprising the step of:
in response to a determination that either said voltage is not between said first voltage threshold and said second voltage threshold or that said temperature is not between said first temperature threshold and said second temperature threshold, starting said measurement cycle again.

13. The method according to claim 1, wherein the step of determining said current charging method of said battery utilizing said controller further comprises the step of determining, utilizing said controller, whether said battery is currently not being charged.

14. The method according to claim 13, further comprising the steps of
determining whether a voltage of said battery is less than a first voltage threshold;
in response to a determination that said voltage is less than said first voltage threshold, starting charging said battery utilizing a trickle charging method.

15. The method according to claim 14, further comprising the steps of:
in response to a determination that said voltage is not less than said first voltage threshold, determining whether said voltage is between said first voltage threshold and a second voltage threshold, and whether a temperature of said battery is between a first temperature threshold and a second temperature threshold; and
in response to a determination that said voltage is between said first voltage threshold and said second voltage threshold and that said temperature is between said first temperature threshold and said second temperature threshold, starting charging said battery utilizing a quick charging method.

16. The method according to claim 15, further comprising the steps of:
in response to a determination that either said voltage is not between said first voltage threshold and said second voltage threshold or that said temperature is not between said first temperature threshold and said second temperature threshold, starting said measurement cycle again.

17. The method according to claim 1, further comprising the step of:
determining characteristics of said current charging method of said battery utilizing said controller.

18. The method according to claim 17, further comprising the step of
determining, utilizing said controller, said characteristics including a number of times said battery has been charged.

19. The method according to claim 17, further comprising the step of:
determining, utilizing said controller, said characteristics including a length of time said battery has been charging.

20. The method according to claim 17, further comprising the step of:
obtaining, by said processor that is external to said battery charger, said battery characteristics and said characteristics of said current charging method using said bus interface.

21. A battery charger comprising:
a controller within said battery charger, said controller capable of responding to interrupts and capable of being coupled to a processor that is external to said battery charger utilizing a bus interface that is included in said controller;
said controller for monitoring battery characteristics of said battery during normal non-charging battery operation and during charging of said battery:
said controller including status registers for maintaining, during normal operation of said battery, detailed status information including said battery characteristics;
said status registers for maintaining, during charging of said battery, said detailed status information and an identification of a current charging method;
said controller for starting a measurement cycle;
during said measurement cycle:
said controller for determining current battery characteristics;
said controller for determining, at a start of said measurement cycle, prior to beginning charging or altering said current charging method of said battery, said current charging method of said battery by reading said status registers;
said controller for utilizing said determined battery characteristics and said determined current charging method to determine an appropriate charging method for said battery; and
said controller for causing said battery charger to charge said battery utilizing said appropriate charging method.

22. The charger according to claim 21, further comprising:
- said controller being coupled to said processor that is external to said battery charger; and
- battery information being provided to said processor from said controller, said battery information including said battery characteristics and charging method information.

23. The charger according to claim 21, further comprising:
- said controller for determining charging method information including a number of times said battery has been charged.

24. The charger according to claim 21, further comprising:
- said controller for determining whether said battery is currently being charged utilizing a quick charging method.

25. The charger according to claim 24, further comprising:
- in response to a determination that said battery is currently being charged utilizing a quick charging method, said controller for determining whether a temperature of said battery exceeds a first temperature threshold;
- in response to a determination that said temperature of said battery does not exceed said first threshold, said controller for determining whether a time during which said battery has been charged utilizing any method exceeds a time threshold;
- in response to a determination that said time during which said battery has been charged utilizing any method does exceed a time threshold, said controller for determining whether said battery has been fully charged, and
- in response to a determination that said battery has been fully charged, said controller for incrementing a charge counter, said charge counter indicating a number of times said battery has completed a charge cycle.

26. The charger according to claim 25, further comprising:
- in response to a determination that said temperature of said battery does exceed said first threshold, said controller for determining whether said battery has been fully charged; and
- in response to a determination that said battery has been fully charged, said controller for incrementing said charge counter.

27. The charger according to claim 26, further comprising:
- in response to a determination that said battery baa not been fully charged, said controller for halting said quick charging method; and
- said controller for causing said battery to be charged utilizing a trickle charging method.

28. The charger according to claim 25, further comprising:
- in response to a determination that said time during which said battery has been charged utilizing any method does not exceed a time threshold, said controller for starting said measurement cycle again.

29. The charger according to claim 21, further comprising:
- said controller for determining whether said battery is currently being charged utilizing a trickle charging method.

30. The charger according to claim 29, further comprising:
- said controller for determining whether a voltage of said battery is between a first voltage threshold and a second voltage threshold, and whether a temperature of said battery is between a first temperature threshold and a second temperature threshold; and
- in response to a determination that said voltage is between said first voltage threshold and said second voltage threshold and that said temperature is between said first temperature threshold and said second temperature threshold, said controller for causing said battery to be charged utilizing a quick charging method.

31. The charger according to claim 30, further comprising:
- said controller for starting a timer.

32. The charger according to claim 30, further comprising:
- in response to a determination that either said voltage is not between said first voltage threshold and said second voltage threshold or that said temperature is not between said first temperature threshold and said second temperature threshold, said controller for starting said measurement cycle again.

33. The charger according to claim 21, further comprising:
- said controller for determining whether said battery is currently not being charged.

34. The charger according to claim 33, further comprising:
- said controller for determining whether a voltage of said battery is less than a first voltage threshold;
- in response to a determination that said voltage is less than said first voltage threshold, said controller for causing said battery to be charged utilizing a trickle charging method.

35. The charger according to claim 34, further comprising:
- in response to a determination that said voltage is not less than said first voltage threshold, said controller for determining whether said voltage is between said first voltage threshold and a second voltage threshold, and whether a temperature of said battery is between a first temperature threshold and a second temperature threshold; and
- in response to a determination that said voltage is between said first voltage threshold and said second voltage threshold and that said temperature is between said first temperature threshold and said second temperature threshold, said controller for causing said battery to be charged utilizing a quick charging method.

36. The charger according to claim 35, further comprising:
- in response to a determination that either said voltage is not between said first voltage threshold and said second voltage threshold or that said temperature is not between said first temperature threshold and said second temperature threshold, said controller for starting said measurement cycle again.

37. The charger according to claim 21, further comprising:
- said controller for determining characteristics of said current charging method of said battery.

38. The charger according to claim 37, further comprising:

said controller for determining said characteristics including a number of times said battery has been charged.

39. The charger according to claim 37, further comprising:

said controller for determining said characteristics including a length of time said battery has been charging.

40. The charger according to claim 37, further comprising:

said processor that is external to said buttery charger capable of obtaining from said controller said battery characteristics and said characteristics of said current charging method.

\* \* \* \* \*